United States Patent
Maede et al.

(10) Patent No.: US 10,750,091 B2
(45) Date of Patent: Aug. 18, 2020

(54) ACTUATOR DRIVER, IMAGING DEVICE USING THE SAME, AND IMAGING METHOD

(71) Applicant: ROHM CO., LTD., Ukyo-ku, Kyoto (JP)

(72) Inventors: Jun Maede, Ukyo-ku Kyoto (JP); Akihito Saito, Ukyo-ku Kyoto (JP); Yoshihiro Sekimoto, Ukyo-ku Kyoto (JP)

(73) Assignee: ROHM CO., LTD., Kyoto (JP)

( * ) Notice: Subject to any disclaimer, the term of this patent is extended or adjusted under 35 U.S.C. 154(b) by 67 days.

(21) Appl. No.: 15/944,097

(22) Filed: Apr. 3, 2018

(65) Prior Publication Data

US 2018/0295286 A1 Oct. 11, 2018

(30) Foreign Application Priority Data

Apr. 5, 2017 (JP) ................. 2017-075537

(51) Int. Cl.
*H04N 5/232* (2006.01)
*G02B 27/64* (2006.01)
*G03B 5/02* (2006.01)

(52) U.S. Cl.
CPC ....... *H04N 5/23264* (2013.01); *G02B 27/646* (2013.01); *G03B 5/02* (2013.01); *H04N 5/23258* (2013.01); *H04N 5/23261* (2013.01); *H04N 5/23267* (2013.01); *H04N 5/23287* (2013.01); *G03B 2205/0007* (2013.01)

(58) Field of Classification Search
CPC ........... H04N 5/23258; H04N 5/23264; H04N 5/23261; H04N 5/23267; H04N 5/2328; H04N 5/23287; G02B 27/646; G03B 5/02; G03B 2205/0007

See application file for complete search history.

(56) References Cited

U.S. PATENT DOCUMENTS

| | | | |
|---|---|---|---|
| 8,760,524 B2 * | 6/2014 | Yun | H04N 5/23212 348/207.99 |
| 2006/0127071 A1 * | 6/2006 | Takeuchi | G02B 27/646 396/55 |
| 2010/0177198 A1 | 7/2010 | Hayashi et al. | |

FOREIGN PATENT DOCUMENTS

| | | |
|---|---|---|
| JP | 2001154226 A | 6/2001 |
| JP | 2010078635 A | 4/2010 |
| JP | 2013178503 A | 9/2013 |

(Continued)

OTHER PUBLICATIONS

KIPO Notification of Reason for Refusal, corresponding to Application No. KR10-2018-0037241 dated Mar. 27, 2019.

*Primary Examiner* — Daniel M Pasiewicz
(74) *Attorney, Agent, or Firm* — Cantor Colburn LLP

(57) ABSTRACT

An imaging device includes an imaging lens, an imaging element that captures an image transmitted through the imaging lens, a blur detection part configured to detect a blur, an actuator configured to determine a position of the imaging lens, and an actuator driver configured to control the actuator in accordance with a blur detection signal from the blur detection part. The shift of the image occurring when forcibly changing the position of the imaging lens is corrected by shift of an effective pixel area of the imaging element according to the forcible change amount of the position of the imaging lens.

4 Claims, 10 Drawing Sheets

(56) References Cited

FOREIGN PATENT DOCUMENTS

| | | |
|---|---|---|
| JP | 2015179988 A | 10/2015 |
| WO | 2009011105 A1 | 1/2009 |

\* cited by examiner

ACTUATOR DRIVER, IMAGING DEVICE USING THE SAME, AND IMAGING METHOD

CROSS-REFERENCE TO RELATED APPLICATION

The present application claims priority under 35 U.S.C. § 119 to Japanese Patent Application No. 2017-075537, filed on Apr. 5, 2017, the entire contents of which are incorporated herein by reference.

TECHNICAL FIELD

The present disclosure relates to an actuator driver, an imaging device using the same, and an imaging method.

BACKGROUND

Recently, a function of controlling a position of an imaging lens with high precision at a high speed by detecting the position of an imaging lens and feeding back the position information has been increasingly introduced into a camera module mounted in a smartphone or the like. In particular, since it is now possible to perform highly-precise hand blur correction by introducing feedback control into optical hand blur correction (optical image stabilization (OIS)), it is expected that more cameras using OIS will be used in the future with the growing demand for capturing distant subjects in a dark place without blurring. In a camera with the OIS function into which such feedback control is introduced, the hand blur is corrected by detecting an angular velocity of the hand blur by a gyro sensor, integrating the detected angular velocity to calculate an angle blur amount, and moving a position of a lens according to the angle blur amount while detecting the position of the lens.

As described above, since the angle blur amount is obtained by integrating the angular velocity, there may be a concern that DC components generated by the integration are accumulated. That is, the DC components are accumulated while repeating the AC operation of hand blur correction. Therefore, when the DC components are accumulated, since the feedback control is performed, the position of the lens is offset, which may make it difficult to give a sufficient displacement to a biased side.

In the related art, a technique has been used in which, when the hand blur correction exceeds a limited range during an operation of OIS, a centering operation is performed and a lens is returned to a predetermined position. The centering operation has been used at the end of divided exposure when optical hand blur correction and addition-type hand blur correction are combined.

When the accumulated DC component of the angle blur signal is refreshed to return to a zero level, the position detection signal of the lens also returns to an initial state and a centering operation is executed. This means that the position of the lens moves suddenly, so that a user may feel a sense of incompatibility due to a sudden image change such as capturing a continuous moving image. If the centering operation is performed so slowly that the user does not feel the sense of incompatibility, there may be a possibility that a movable range becomes insufficient while performing the centering operation, which may result in failure of the hand blur correction.

In the case of performing addition-type divided exposure while executing the optical hand blur correction, when the position of the lens approaches the limit of the movable range, if the divided exposure is terminated and the centering operation is performed, it takes a time to calculate a pixel shift amount for position alignment by comparing images before and after the centering.

SUMMARY

Some embodiments of the present disclosure provide an imaging device capable of suppressing an image shift caused by a centering operation.

According to one embodiment of the present disclosure, there is provided a imaging device including an imaging lens, an imaging element that captures an image transmitted through the imaging lens, a blur detection part configured to detect a blur, an actuator configured to determine a position of the imaging lens, and an actuator driver configured to control the actuator in accordance with a blur detection signal from the blur detection part. The shift of the image occurring when forcibly changing the position of the imaging lens is corrected by shift of an effective pixel area of the imaging element according to the forcible change amount of the position of the imaging lens.

According to one embodiment, in a case where the position of the imaging lens is biased from a predetermined position, when the position of the imaging lens is forcibly returned to an original predetermined position, the effective pixel area of the imaging element is shifted according to the shift of the image, so that a rapid image shift cannot be seen on the monitor screen viewed by the user or the recorded image. Thus, the centering can be performed without realizing the shift of the image by the user.

The imaging device may calculate the forcible change amount of the position of the imaging lens from a change amount of a drive signal of the actuator.

A change amount of the position of the imaging lens corresponds to a change amount of the drive signal for driving the actuator, so that it is possible to perform an appropriate correction.

The imaging device may further include a position detection part configured to generate a position detection signal indicating the position of the imaging lens. The actuator driver may be configured to feedback-control the position of the imaging lens based on the position detection signal. The imaging device may calculate the forcible change amount of the position of the imaging lens from the change amount of a DC component of the position detection signal.

By converting the change amount of the DC component of the position detection signal into the displacement amount of the image on the pixel, the shift amount and direction of the effective pixel area can be determined.

The imaging device may calculate the forcible change amount of the position of the imaging lens from the change amount of the DC component of the blur detection signal.

By converting the change amount of the DC component of the blur detection signal into the displacement amount of the image on the pixel, the shift amount and direction of the effective pixel area can be determined.

The imaging device further includes a pan/tilt detection part, wherein, when it is determined that a pan/tilt operation is performed, the position of the imaging lens is forcibly changed.

With this configuration, the DC component of the imaging lens position accumulated until it is determined as pan/tilt can be eliminated quickly, so that it is possible to accurately correct the image shift.

The imaging device may gradually release the shift of the effective pixel area.

There is no pixel margin for the next pixel shift of the effective pixel area while the effective pixel area is shifted, whereas the shifted pixel is returned to the original state so that a pixel margin can be generated again. In addition, since the pixel is gradually returned to the original state, the user hardly realizes that the image is moving.

The operation of releasing the shift of the effective pixel area is performed until the position of the imaging lens is forcibly changed.

With this configuration, since the bias of an effective pixel area occurring by pixel shift can be released up to the next centering, the pixel can be effectively utilized and the correction range can be widened.

According to another embodiment of the present disclosure, an actuator driver drives an actuator to determine a position of an imaging lens for correcting image blur. The actuator driver can forcibly change a DC component of the position of imaging lens based on the position information of the imaging lens, and, in case of forcibly changing the DC component, the forcible change amount of the position of the imaging lens or the amount of shift of an effective pixel area based on the forcible change amount as information for shift of the effective pixel area is output.

With this configuration, a processor, which processes an output of the imaging element, can appropriately set the effective pixel area based on the information from the actuator driver.

The position information of the imaging lens may be obtained from a drive current of the actuator. Also, the position information of the imaging lens may be obtained using a position detection signal from a position detection part included in the actuator.

The actuator driver may further include a calculation part configured to calculate a blur angle based on angular velocity information from a blur detection part, wherein the position of the imaging lens is forcibly changed by changing a DC component of the blur angle.

The actuator driver may further include a pan/tilt detection part, wherein, when it is determined as a pan/tilt operation, a DC component of the position of the imaging lens may be changed.

DETAILED DESCRIPTION

Figure 1:
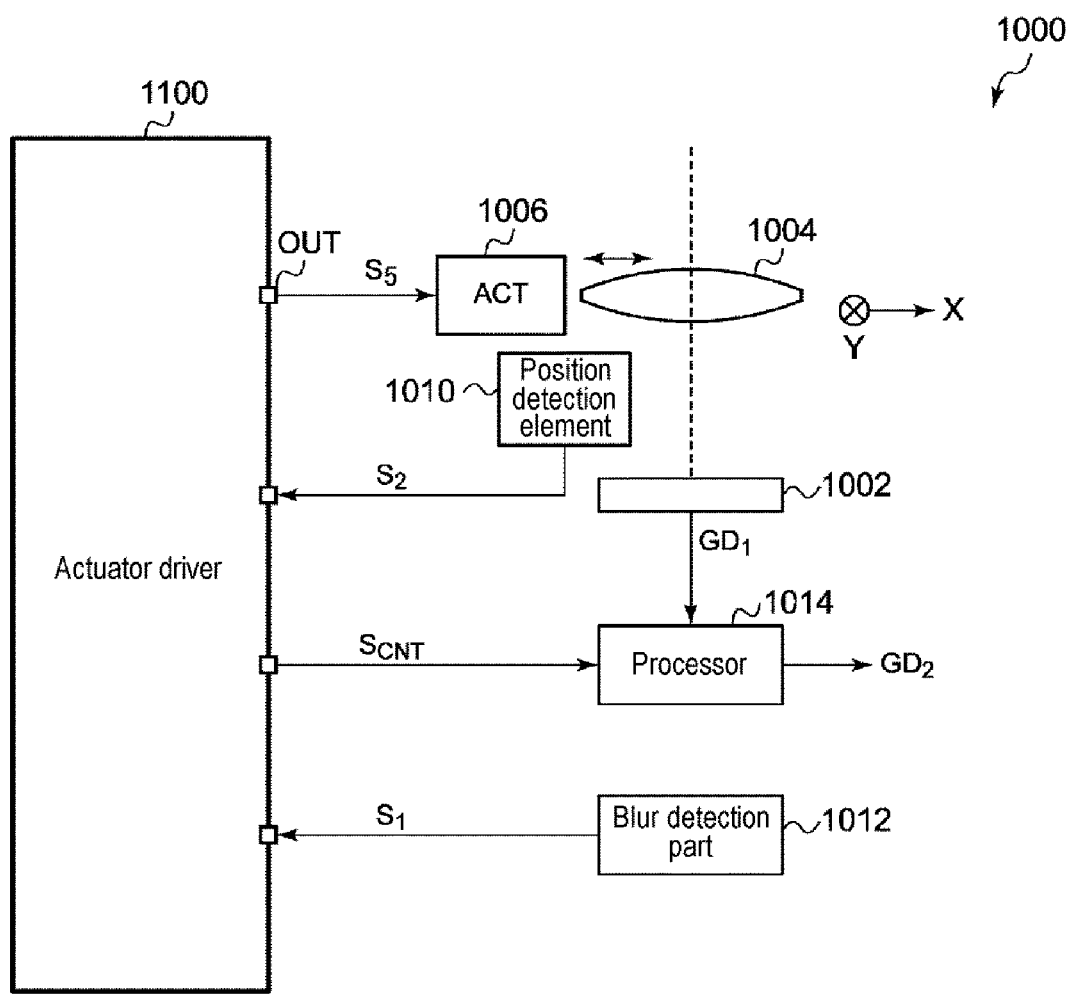
FIG. 1 is a diagram showing the basic configuration of an imaging device with a hand blur correction function according to an embodiment.

Embodiments of the present disclosure will be now described in detail with reference to the drawings. Like or equivalent components, members, and processes illustrated in each drawing are given like reference numerals and a repeated description thereof will be properly omitted. Further, the embodiments are presented by way of example only, and are not intended to limit the present disclosure, and any feature or combination thereof described in the embodiments may not necessarily be essential to the present disclosure.

Further, the dimensions (thickness, length, width, etc.) of each member illustrated in the drawings may be scaled appropriately for easy understanding in some cases. Furthermore, the dimensions of a plurality of members do not necessarily represent the magnitude relationship between them. For example, even when a certain member A is drawn thicker than another member B in the drawings, the member A may be thinner than the member B.

In the present disclosure, "a state where a member A is connected to a member B" includes a case where the member A and the member B are physically directly connected or even a case where the member A and the member B are indirectly connected through any other member that does not affect an electrical connection state between the members A and B or does not impair functions and effects achieved by combinations of the members A and B.

Similarly, "a state where a member C is installed between a member A and a member B" includes a case where the member A and the member C or the member B and the member C are indirectly connected through any other member that does not affect an electrical connection state between the members A and C or the members B and C or does not impair function and effects achieved by combinations of the members A and C or the members B and C, in addition to a case where the member A and the member C or the member B and the member C are directly connected.

FIG. 1 is a diagram illustrating a basic configuration of an imaging device 1000 with a hand shake correction function according to an embodiment. The imaging device 1000 is a camera module, which is built in a digital camera, a digital video camera, a smartphone or a tablet terminal. In FIG. 1, only blocks related to hand shake correction are shown but blocks related to autofocus are emitted.

The imagine device 1000 includes an imaging element 1002, an imagine lens 1004, an actuator 1006, an actuator driver 1100, a position detection element 1010, a blur detection part 1012 and a processor 1014 for image processing.

The imagine lens 1004 is installed on an optical path of light incident on the imaging element 1002. The imaging lens 1004 is supported such that its position is determined within a plane perpendicular to its optical axis (a plane parallel to the imaging plane on the imaging element 1002). Specifically, the imaging lens 1004 is configured such that its position can be determined independently in a first direction (X direction) along one side of the imaging element 1002 and a second direction (Y direction) perpendicular to the first direction, respectively.

The actuator 1006 is configured so as to determine a position the imaging lens 1004. As described above, the imaging lens 1004 is configured such that its position can be determined independently in the X direction and the Y direction. Therefore, two actuators 1006 are installed for the X axis and the Y axis, respectively. In FIG. 1, only the X-axis is shown for ease of understanding.

The blur detection part 1012 is, for example, a gyro sensor and detects blur of the imaging device 1000. The actuator driver 1100 receives a blur detection signal $S_1$ indicating the blur amount detected by the blur detection part 1012 and controls the actuator 1006 so that the blur is canceled out. Specifically, a position of the X-axis direction of the imaging lens 1004 is determined based on the blur detection signal $S_1$ in a yaw direction and a position of the Y-axis direction of the imaging lens 1004 is determined based on the blur detection signal $S_1$ in the pitch direction.

In the hand blur correction, since it is necessary to accurately determine a position of the imaging lens 1004, a feedback control (closed loop control) is adopted. The position detection element 1010 is, for example, a magnetic detection element such as a Hall sensor or the like, and generates a position detection signal (Hall signal) $S_2$ indicating the displacement of the imaging lens 1004.

The actuator driver 1100 performs feedback control for a drive signal $S_5$ such that the position of the imaging lens 1004 indicated by the position detection signal $S_2$ coincides with a target position according to a blur angle. For example, the actuator driver 1100 performs linear control between the angle blur amount θ and the displacement of the imaging lens 1004.

When a gyro sensor is used as the blur detection part 1012, the blur detection signal $S_1$ has a dimension of angular velocity. The actuator driver 1100 calculates the angle blur amounts $\theta_P$ and $\theta_Y$ by integrating the blur detection signal $S_1$ in each of the yawing direction and the pitch direction and displaces the imaging lens 1004 according to the angle blur amounts $\theta_P$ and $\theta_Y$.

Figure 2:
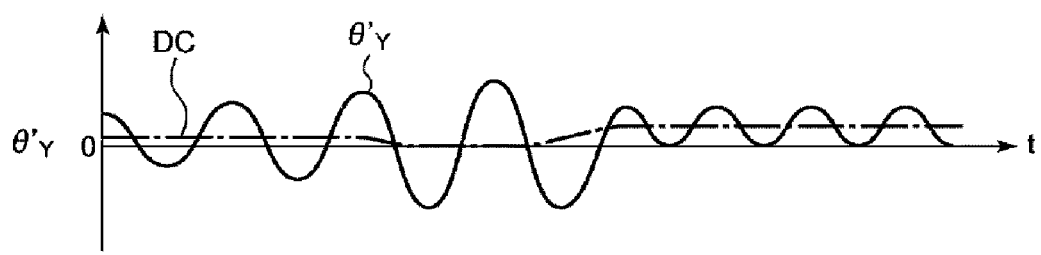
FIG. 2 is a diagram for explaining the accumulation of DC components.
Figure 2:
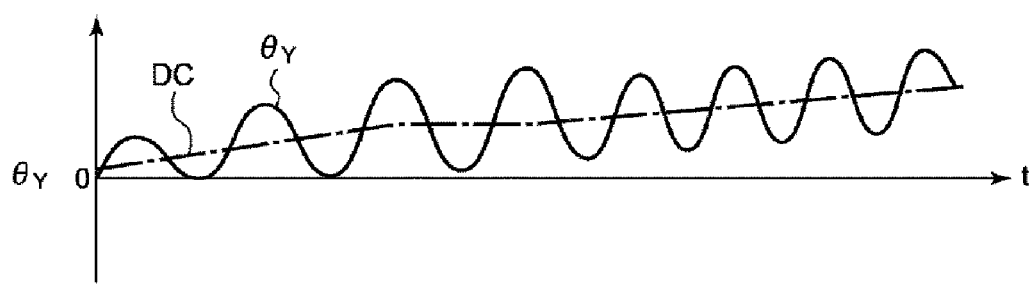
Figure 2:
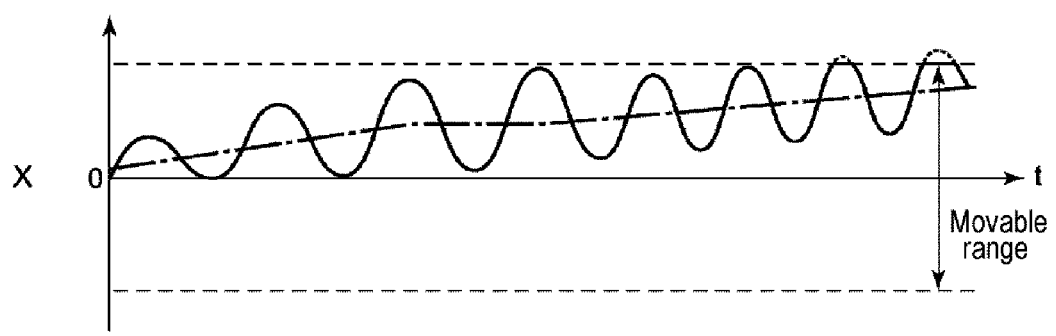

When the integration of the blur detection signal $S_1$ is repeated in the actuator driver 1100, the DC components are accumulated. FIG. 2 is a graph for explaining the accumulation of DC components. $\theta_Y'$ represents the angular velocity in the yaw direction and $\theta_Y$ represents the yaw angle (angle blur amount). When a DC component indicated by an alternate long and short dash line is included in the yaw angular velocity $\theta_Y'$, a DC component of the angle blur amount $\theta_Y$ obtained by integrating the DC component included in yaw angular velocity $\theta_Y'$ increases with time. When linearly controlling the displacement amount of the imaging lens 1004 in the X-axis direction with respect to the angle blur amount $\theta_Y$, the position of the imaging lens 1004 shifts with time. When the position of the imaging lens 1004 reaches a movable range, the hand blur correction process fails. The same problem arises also in the pitch direction.

Therefore, when the DC component of the angle blur amount $\theta_Y$ increases to some extent, in other words, when the amount of offset from the reference position (for example, X=0) of the imaging lens 1004 increases to some extent, the actuator driver 1100 forcibly changes the position of the imaging lens 1004 in a direction approaching the reference position. This process is referred to as a centering process. The centering process may be performed based on (i) the position detection signal $S_2$ from the position detection element 1010, (ii) the blur detection signal $S_1$ from the blur detection part 1012, (iii) an output (drive current or drive voltage) of a driver part 1112, or (iv) an internal signal of a controller 1110. For example, a DC component of the position detection signal $S_2$ deviating from a predetermined range may be used as a trigger to perform the centering process. Further, the angle blur amount and the magnitude of the offset amount for centering may be arbitrarily set to allow the centering to be performed finely for each frame.

Figure 3A:
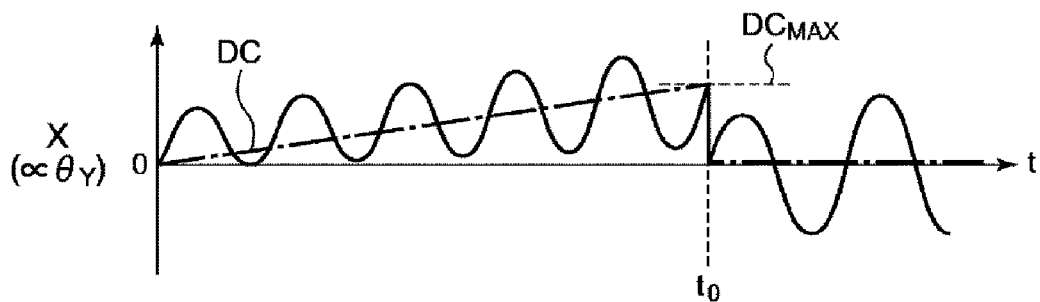
FIG. 3A to FIG. 3C are diagrams for explaining a centering process.
Figure 3B:
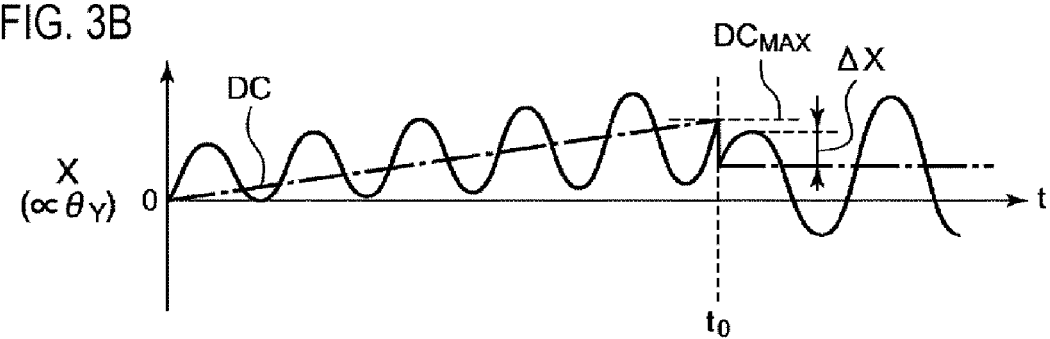
Figure 3C:
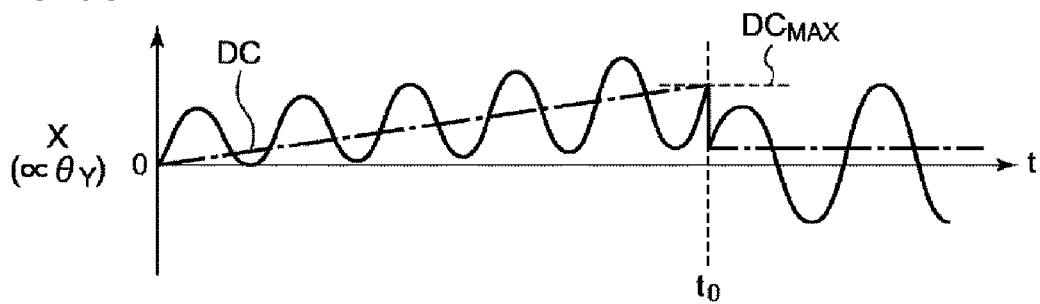

FIG. 3A to FIG. 3C are graphs for explaining the centering process. It is here desirable that the change in the position of the imaging lens 1004 is performed in a short time. Time $t_0$ is a timing of the centering process. Here, when a DC component at the position X of the imaging lens 1004 reaches a threshold value $DC_{MAX}$, the centering process occurs. As shown in FIG. 3A, the actuator driver 1100 may reset the position of the imaging lens 1004 to the reference position (X=0). In the centering process, the position of the imaging lens 1004 may be changed by changing the angle blur amount θ.

As shown in FIG. 3B, the actuator driver 1100 may shift the imaging lens 1004 toward the reference position (X=0) by a predetermined amount ΔX.

As shown in FIG. 3C, the actuator driver 1100 may shift the imaging lens 1004 toward the reference position (X=0) by a change amount obtained by multiplying the position just before the reset (or the offset amount at the position just before the reset) by a predetermined coefficient.

Figure 4:
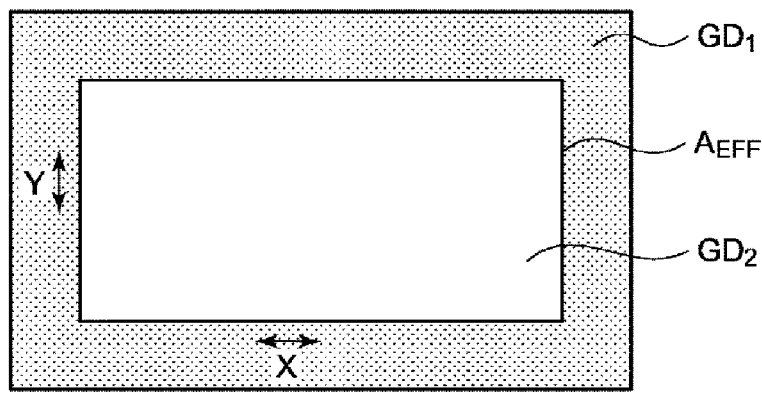
FIG. 4 is a view showing the relationship between raw data $GD_1$ and image data $GD_2$.

Returning to FIG. 1, the imaging element 1002 takes a picture of an image transmitted through the imaging lens 1004 to generate raw data. $GD_1$. The processor 1014 processes the raw data $GD_1$ taken by the imaging element 1002 and outputs image data $GD_2$. FIG. 4 is a diagram showing the relationship between the raw data $GD_1$ and the image data $GD_2$. The raw data $GD_1$, which is the output of the imaging element 1002, may include luminance data of all the pixels of one frame of the imaging element 1002. On the other hand, the finally-generated image data $GD_2$ is obtained by extracting pixels in an effective pixel area. $A_{EFF}$ from all the pixels, and data outside the effective pixel area $A_{EFF}$ may be discarded. The processor 1014 is configured to shift the effective pixel area $A_{EFF}$ in the X direction and the Y direction based on a control signal $S_{CNT}$ from the actuator driver 1100. The function of the processor 1014 may be implemented in the imaging element 1002. The shift of the effective pixel area $A_{EFF}$ may be achieved by using the same process as the electronic hand blur correction.

Returning to FIG. 1 again, in this manner, the actuator driver 1100 is configured to forcibly change the DC component of the position of the imaging lens 1004. When the position of the imaging lens 1004 is forcibly changed, the actuator driver 1100 outputs the control signal $S_{CNT}$ indicating the forcible change amount ΔX of the lens position or the shift amount of the effective pixel area $A_{EFF}$ based on the forcible change amount ΔX, as information for shift of the effective pixel area $A_{EFF}$ by the processor 1014. The processor 1014 shifts the effective pixel area. $A_{EFF}$ according to the control signal $S_{CNT}$.

That is, the imaging device 1000 corrects an image shift caused when the position of the imaging lens 1004 is forcibly changed, by the shift of the effective pixel area $A_{EFF}$ according to the forcible change amount ΔX of the position of the imaging lens 1004.

Figure 5:
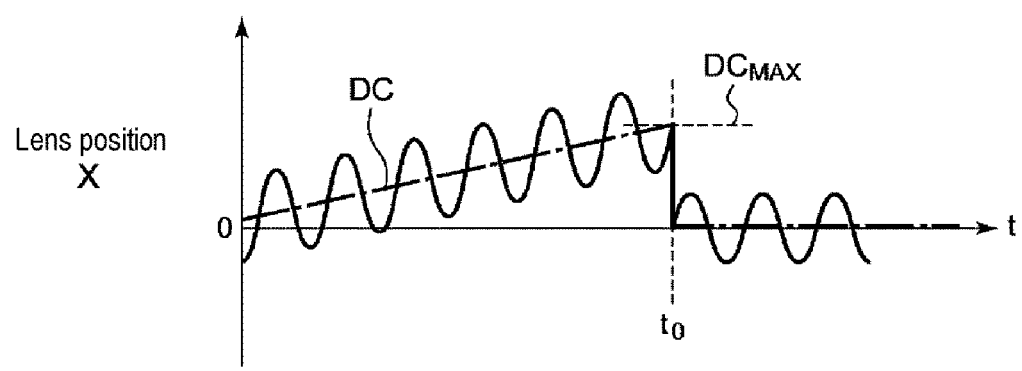
FIG. 5 is an operation waveform diagram of a camera module of FIG. 1.
Figure 5:
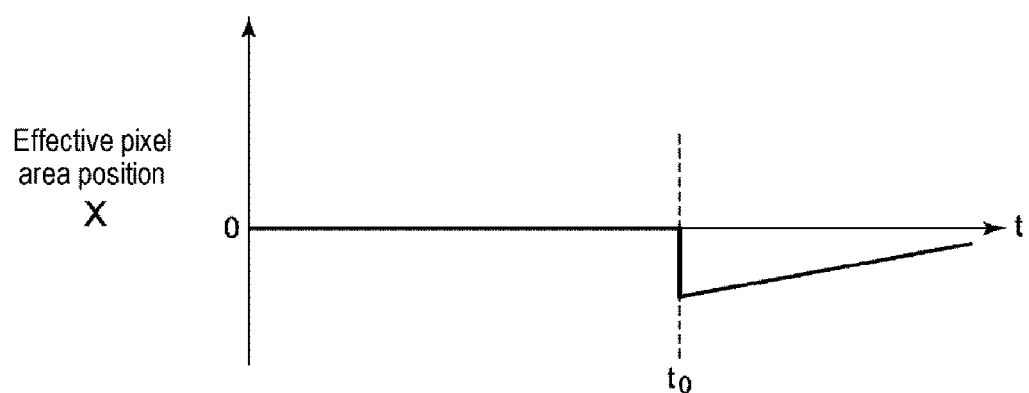

The basic configuration of the imaging device 1000 has been described above. FIG. 5 is an operation waveform diagram of the imaging device 1000 in FIG. FIG. 5 shows a centering process in the yaw direction, in which the displacement amount in the X direction of the imaging lens 1004 and the x coordinate (for example, the center coordinate) of the reference point of the effective pixel area $A_{EFF}$ are shown in order from the top. The upper broken line represents a DC offset component. Before time $t_0$, DC components of an angular velocity signal are accumulated, thereby increasing the DC offset of the X coordinate of the imaging lens 1004. When the DC offset component reaches a threshold $DC_{MAX}$ at time $t_0$, a centering process occurs. At this time, the actuator driver 1100 supplies the control signal $S_{CNT}$ depending on the amount of change in the position of the imaging lens 1004 to the processor 1014. As a result, the processor 1014 shifts the reference point of the effective pixel area $A_{EFF}$ by the direction and amount corresponding to the control signal $S_{CNT}$. After that, the processor 1014 gradually releases the shift of the effective pixel area $A_{EFF}$ with time.

Figure 6:
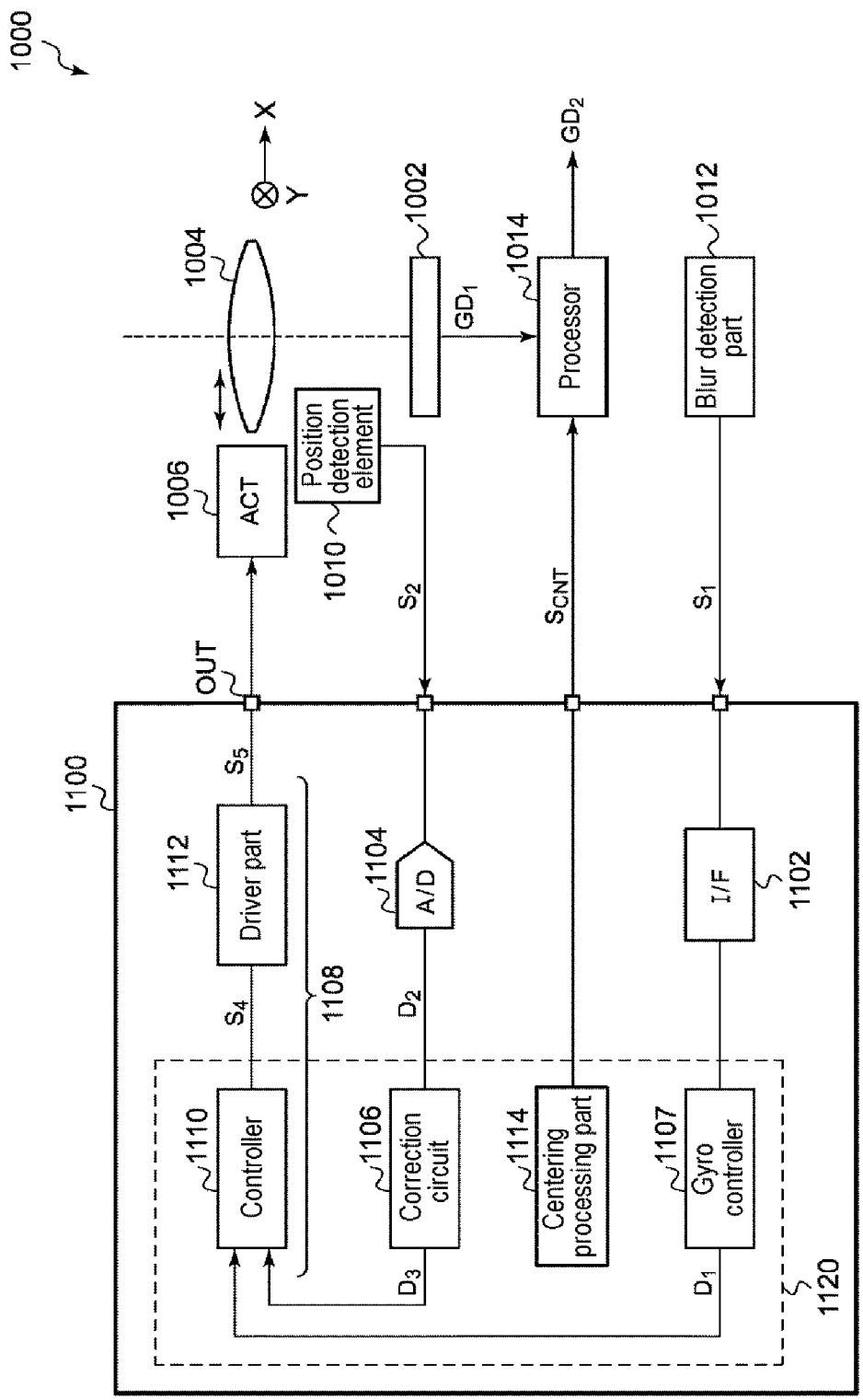
FIG. 6 is a block diagram showing the configuration of an actuator driver.

Subsequently, a configuration example of the actuator driver 1100 will be described. FIG. 6 is a block diagram showing the configuration of the actuator driver 1100. The actuator driver 1100 includes an interface circuit 1102, an A/D converter 1104, a correction circuit 1106, a gyro controller 1107 and a centering processing part 1114. The actuator driver 1100 may be a functional IC integrated on one semiconductor substrate. Only blocks related to blur in the yaw direction and the corresponding control of the actuator 1006 in the X-axis direction are shown in FIG. 6.

The interface circuit 1102 receives the digital angular velocity signal $S_1$ from the blur detection part 1012. The A/D converter 1104 converts the position detection signal $S_2$ output from the position detection element 1010 into a digital detection code $D_2$. An amplifier may be installed at the front stage of the A/D converter 1104. When the position detection signal $S_2$ is a digital signal, the A/D converter 1104 can be omitted.

The correction circuit 1106 converts the detection code $D_2$ into a detection code $D_3$ having a linear relationship with the actual displacement of the imaging lens 1004 (linear compensation). The correction circuit 1106 may perform temperature compensation. The correction circuit 1106 may be omitted.

The gyro controller 1107 generates a target code $D_1$ indicating the displacement amount (target position) of the imaging lens 1004 based on the angular velocity signal $S_1$. For example, the gyro controller 1107 may integrate the angular velocity signal $S_1$ to generate angle information, and may multiply the angle information by a coefficient to obtain the target code $D_1$.

The control circuit 1108 controls the actuator 1006 such that the detection code $D_3$ approaches the target code $D_1$. The control circuit 1108 includes a controller 1110 and a driver part 1112. The controller 1110 generates a control command value $S_4$ such that an error between the detection code $D_3$ and the target code $D_1$ approaches zero. The driver part 1112 supplies a drive signal $S_5$ depending on the control command value $S_4$ to the actuator 1006.

The centering processing part 1114 executes the above-described centering process. When executing the centering process to forcibly change the position of the imaging lens 1004, the centering processing part 1114 outputs the control signal $S_{CNT}$ indicating the forcible change amount $\Delta X$ of the lens position or the shift amount of the effective pixel area $A_{EFF}$ based on the forcible change amount $\Delta X$, as the information for shift of the effective pixel area $A_{EFF}$ by the processor 1014. The control signal $S_{CNT}$ is generated for each of the X direction (yawing) and Y direction (pitch direction).

The actuator driver 1100 may include a processor core (internal processor) 1120. The controller 1110, the correction circuit 1106, the gyro controller 1107 and the centering processing part 1114 described above may be implemented by a combination of the processor core 1120 and programs.

The present disclosure extends to various devices and circuits derived from the above description and is not limited to a specific configuration. In the following, more specific configuration examples and modifications will be described in order to aid understanding of the essence of the present disclosure and circuit operations and to clarify them, rather than to narrow the scope of the present disclosure.

Figure 7:
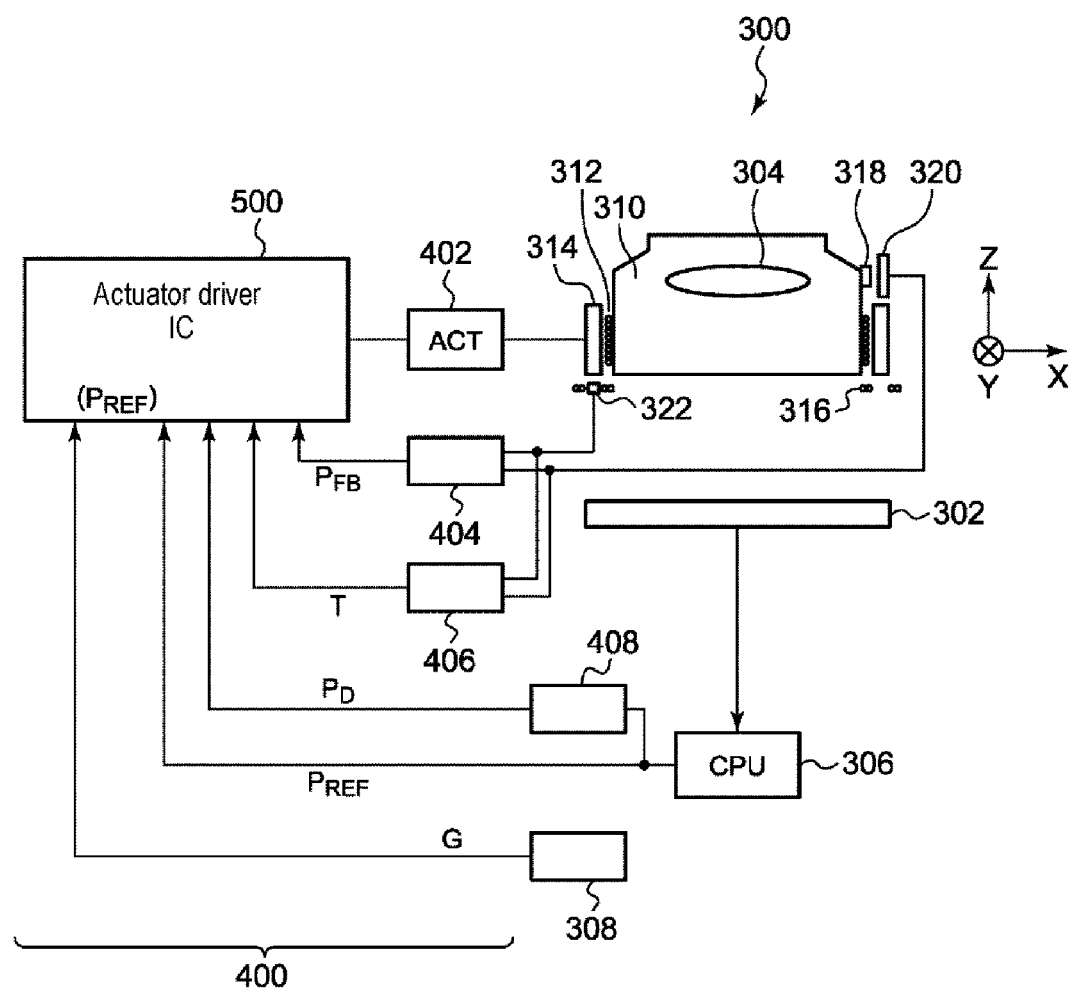
FIG. 7 is a diagram showing an imaging device.

FIG. 7 is a diagram showing an imaging device 300. The imaging device 300 is a camera module, which is built in a digital camera, a digital video camera, a smartphone or a tablet terminal. The imaging device 300 includes an imaging element 302, an imaging lens 304, a processor 306 and a lens control device 400. The imaging lens 304 is disposed on the optical axis of light incident onto the imaging element 302. The lens control device 400 determines a position of the imaging lens 304 based on a position command value (also called a target code) $P_{REF}$ or the like output from the processor 306.

For an auto focus (AF) operation, the lens control device 400 displaces the imaging lens 304 in the optical axis direction (Z-axis direction). The processor 306 generates the position command value $P_{REF}$ such that the contrast of an image taken by the imaging element 302 becomes high (contrast AF). Alternatively, the position command value $P_{REF}$ may be generated based on an output from an AF sensor which is installed outside the imaging element 302 or is embedded in an imaging surface of the imaging element 302 (phase difference AF).

For an optical image stabilization (OIS) operation, the lens control device 400 displaces the imaging lens 304 in a direction perpendicular to the optical axis (X-axis and/or Y-axis direction) in a plane parallel to the imaging element 302. The output of the gyro sensor 308 is input to the actuator driver IC 500. The angular velocity is integrated into an angle in the actuator driver, the position command value $P_{REF}$ is generated so as to give the lens displacement corresponding to the angle blur amount, and the actuator is driven to displace the lens to the target position. Note that when the gyro sensor 308 is installed in a mobile phone or a smartphone main body for use in combination with an application or the like, the position command value $P_{REF}$ may be generated through the processor 306.

The lens control device 400 controls the actuator 402 by position feedback. Specifically, the lens control device 400 includes an actuator 402, a position detection element (AF/OIS) 404, a temperature detection element (AF/OIS) 406 and an actuator driver IC (Integrated Circuit) 500. The actuator 402 is, for example, a voice coil motor. The imaging lens 304 is mounted on a holder 310 and is supported movably in the Z-axis direction. An AF coil 312 is wound around the holder 310, and a permanent magnet 314 is disposed to face the AF coil 312, When a current flows into the AF coil 312, the imaging lens 304 and the holder 310 are integrally driven in the Z-axis direction due to magnetic interaction with the permanent magnet 314. On the other hand, the entire AF driving mechanism including the permanent magnet 314 is supported movably in the X-axis direction and/or the Y-axis direction. When current flows into an OIS coil 316 disposed in a fixed part, the imaging lens 304, the holder 310, the permanent magnet 314 and the like are driven in the X-axis direction and/or the Y-axis direction 4 due to magnetic interaction with the permanent magnet 314. The fixed part of the voice coil motor is fixed to a housing of the imaging device 300.

A magnetic detection means such as a Hall element is often used as the position detection element 404, and the following description will be given on the assumption of a Hall element. A permanent magnet 318 is attached to an AF movable part of the voice coil motor, for example, the holder 310, and an AF Hall element 320 is attached to an unmovable part. A combination of the permanent magnet 318 and the AF Hall element 320 forms the AF position detection element 404. On the other hand, an OIS Hall element 322 is attached to the fixed part to face the permanent magnet 314. A combination of the permanent magnet 314 and the OIS Hall element 322 forms the OIS position detection element 404. Although the Hall element 322 is shown only for the X axis in FIG. 7, there is also a Hall element for the Y axis at a position hidden by shadow and not visible in the figure. The position detection element 404 generates an electric signal (hereinafter referred to as a position detection signal $P_{FB}$) according to the current position of the imaging lens 304, which is fed back to the actuator driver IC 500.

The actuator driver IC 500 is a functional IC integrated on a single semiconductor substrate. As used herein, the term "integrated" is intended to include both of a case where all elements of a circuit are formed on a semiconductor substrate and a case where main elements of the circuit are integrated on the semiconductor substrate. In addition, some resistors, capacitors and the like for adjustment of a circuit constant may be provided outside the semiconductor substrate. By integrating the circuit on one chip, the circuit area can be reduced and the characteristics of the circuit elements can be kept uniform.

The actuator driver IC 500 feedback-controls the actuator 402 such that the fed-back position detection signal $P_{FB}$ matches the position command value $P_{REF}$.

In this manner, by detecting the position of the imaging lens 304 and using the detected position for feedback position control, it is possible to suppress the transient vibration in a step response to accelerate the convergence and enhance the positioning accuracy to a target position.

Ideally, It is desirable that the relationship between the output of the position detection element 404 (i.e., the position detection signal $P_{FB}$) or the position command value $P_{REF}$ corresponding thereto and the actual displacement of the imaging lens 304 is linear and also invariant for temperature variation and has no variation. Realistically, however, this relationship is nonlinear, has a variation for each imaging device 300, and varies depending on the temperature of the position detection element 404. When the nonlinearity and the temperature change deteriorate the positioning accuracy, the linear compensation and the temperature compensation may be performed. The linear compensation is realized by correcting a value of the position detection signal $P_{FB}$ so as to convert a function indicating the relationship between the position detection signal $P_{FB}$ and the actual displacement into an ideal linear function (straight line). The temperature compensation is realized by correcting the gradient and offset of the relationship between the position detection signal $P_{FB}$ varying depending on the temperature and the actual displacement for each temperature.

In order to obtain actual displacement information, the image information from the imaging element 302 may be used as an image displacement detection element 408. The displacement amount of image is obtained by multiplying information on how many pixels move in an image of a specific pattern by a pixel pitch. The displacement amount of image can be converted into the displacement amount of the lens by using information such as the focal length of the optical system. On the other hand, regarding the temperature information, the Hall elements 320 and 322 can be used as the temperature detection element 406. The temperature detection is performed by utilizing a change in the internal resistance of the Hall element by temperature. The detected temperature information T is input to the actuator driver IC 500. The actuator driver IC 500 corrects drive control of the actuator 402 based on the temperature information T.

Subsequently, a specific configuration example of the lens control device 400 will be described.

Figure 8:
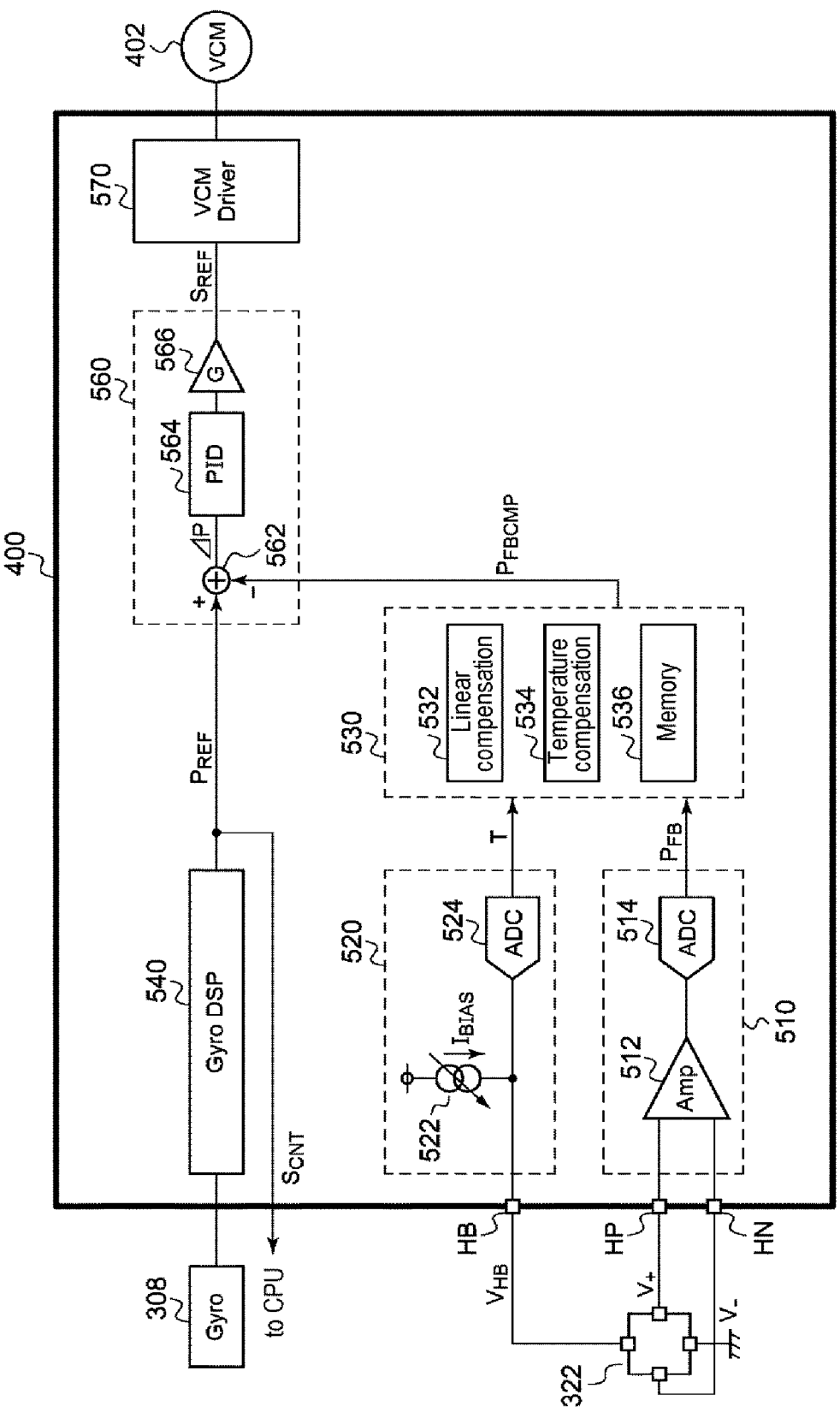
FIG. 8 is a block diagram showing a specific configuration of a portions control device.

FIG. 8 is a specific block diagram of a portion of the lens control device 400. In FIG. 8, only a portion corresponding to one axis of OIS is shown, and the substantively same configuration is prepared for the other axe of OIS and for axes of AF. The position detection element 404 is a Hall element 322, generates Hall voltages V+ and V− according to the displacement of the movable part of the actuator 402, and supplies the generated Hall voltages to Hall detection pins (HP and HN).

A position detection part 510 generates a digital position detection value $P_{FB}$ indicating the position (displacement) of the movable part of the actuator 402 based on the Hall voltages V+ and V−. The position detection part 510 includes a Hall amplifier 512 that amplifies a Hall voltage, and an A/D converter 514 that converts the output of the Hall amplifier 512 into the digital position detection value $P_{FB}$.

A temperature detection part 520 generates a temperature detection value T indicating the temperature. The temperature may be the temperature of the position detection element 404. In FIG. 8, the Hall element 322, which is the position detection element 404, is also used as the temperature detection element 406. This is based on the fact that the internal resistance r of the Hall element 322 has temperature dependence. The temperature detection part 520 measures the internal resistance r of the Hall element 322, which is used as information indicating the temperature.

The temperature detection part 520 includes a constant current circuit 522 and an A/D converter 524. The constant current circuit 522 supplies a predetermined bias current $I_{BIAS}$ to the Hall element 322. The bias current $I_{BIAS}$ is a power supply signal required to operate the Hall element 322. Therefore, the constant current circuit 522 may be grasped as a Hall bias circuit.

A voltage drop ($I_{BIAS} \times r$) occurs between both ends of the Hall element 322 and is input to a Hall bias pin (HB). The A/D converter 524 converts the voltage $V_{HB}$ ($=I_{BIAS} \times r$) of the HB pin into a digital value T. Since the bias current $I_{BIAS}$ is known and constant, the digital value T is proportional to the internal resistance r and therefore contains information on the temperature of the Hall element 322. The relationship between the internal resistance r and the temperature is measured in advance and is made into a function or a table. The digital value T is converted into temperature information in a correction part 530 of the subsequent stage.

A signal from the gyro sensor 308 is input to a gyro DSP (Digital Signal Processor) 540. The gyro DSP 540 cuts off a low frequency band with respect to an angular velocity signal, which is the output of the gyro sensor 308, by a high pass filter and integrates it so as to be converted into a blur angle. This signal is amplified to generate the position command value $P_{REF}$.

The correction part 530 corrects the position detection value $P_{FB}$ output from the position detection part 510. Specifically, the correction part 530 includes a linear compensator 532, a temperature compensator 534 and a memory 536. The linear compensator 532 corrects the linearity of the relationship between the position detection value $P_{FB}$ and the actual displacement. The temperature compensator 534 corrects a change in the relationship due to temperature change with respect to the relationship between the position detection value $P_{FB}$ and the actual displacement. Parameters required for these corrections are stored in the memory 536.

The memory 536 may be a nonvolatile memory such as a ROM or a flash memory, or may be a volatile memory temporarily holding data supplied from an external ROM each time the circuit is activated.

A controller 560 receives the position command value $P_{REF}$ and a position detection value $P_{FBCMP}$ obtained by the correction by the correction part 530. The controller 560 generates a control command value $S_{REF}$ such that the position detection value $P_{FBCMP}$ becomes equal to the position command value $P_{REF}$. When the actuator 402 is a voice coil motor, the control command value $S_{REF}$ is a command value of a drive current to be supplied to the voice coil motor. The controller 560 includes, for example, an error detector 562 and a proportional-integral-derivative (PID) controller 564. The error detector 562 generates a difference (error) $\Delta P$ between the position detection value $P_{FBCMP}$ and the position command value $P_{REF}$. The PID controller 564 generates the control command value $S_{REF}$ by PID calculation. Instead of the PID controller 564, a proportional integral (PI) controller may be used or nonlinear control may be adopted. A gain circuit 566 that multiplies predetermined coefficients may be installed at the subsequent stage of the PID controller 564. A driver part 570 supplies a drive current depending on the control command value $S_{REF}$ to the actuator 402.

As described above, when the angular velocity signal output from the gyro sensor 308 is integrated, there is a possibility that the DC components of the angle may be accumulated. In addition, since a DC current is applied to the actuator 402 in order to obtain the displacement detection signal corresponding to the DC component, there is a possibility that a movable range for the OIS operation cannot be sufficiently obtained on one side. In order to prevent this, it is necessary for the gyro DSP 540 to refresh an angle signal at a predetermined timing. However, when the refreshing is rapidly performed, since the lens position also rapidly returns to the original position (the position when there is no DC component) (image centering), an image changes suddenly. Thus, even if there is no hand blur, an image that looks as if it has hand blur will be produced. In order to correct this by image shift (shift of the effective pixel area), the actuator driver IC outputs the signal $S_{CNT}$ which is the reference of the image shift amount.

One example of a signal that serves as the reference for image shift is the amount of change in an angle signal before and after the refreshing, which is provided to the processor (CPU) 306. The angle signal before and after the refreshing may be provided to the processor 306 as the control signal $S_{CNT}$, and the amount of change may be calculated by the processor 306. FIG. 8 shows this example. When the amount of change in the angle signal is known, it can be converted into the amount of change in the position detection signal of the lens, which corresponds to the known amount of change. When the amount of change in the position detection signal of the lens is known, the target pixel shift amount can be calculated. The processor 306 shifts the effective pixel area based on the calculated pixel shift amount to make the shift of the image due to the centering invisible. The gyro DSP 540 in FIG. 8 can be regarded as a block integrating the functions of the gyro controller 1107 and the centering processing part 1114 in FIG. 6.

The signal which is the reference of the image shift to be returned to the processor 306 is not limited thereto. The centering may be performed at an initial position at the timing that the DC component of the lens position detection signal exceeds a predetermined value. It is desirable to perform refreshing of the angle signal simultaneously with the centering. The DC component of the position detection signal before and after the centering is provided to the processor 306, or the amount of change in the DC component is provided to the processor 306. The processor 306 calculates a pixel shift amount corresponding to the amount of change in the position detection signal and shifts the effective pixel area based on the calculated pixel shift amount to makes the image shift due to the centering invisible.

The drive current of the actuator may be used as the reference signal. When the DC component of the drive current of the actuator exceeds a predetermined value, centering is performed such that the DC component becomes zero. It is desirable in some embodiments to refresh the angle signal simultaneously with the centering. The DC component of the actuator drive current before and after the centering is provided to the processor 306, or the change amount of the DC component is provided to the processor 306. The processor 306 converts the change amount of the DC component of the drive current into the amount of displacement of the lens by using a value of the drive sensitivity of the actuator or the like. When the displacement amount of the lens is known, the target pixel shift amount can be calculated. The processor 306 shifts the effective pixel area based on the calculated pixel shift amount to make the image shift due to the centering invisible.

In order to calculate the amount of change of various DC components and provide them to the processor 306 as described above, it is desirable to mount a CPU in the actuator driver IC 500. When there is a CPU in the actuator driver IC 500, not only the amount of change in DC component but also the amount of shift of the final pixel can be calculated and the calculation result can be provided to the processor 306 so that only a pixel shift is performed by the processor.

The lens control devices corresponding to the respective X, Y and Z axes may be formed as a chip for each axis, or may be integrated as one chip or two chips as a whole.

It should be noted that words such as "refreshing" and "centering" may be associated with "making it 0" or "putting it at a center" but it is not necessarily limited thereto. This includes a case where a signal does not become 0 as a result of the refreshing, and a case where the deviation from center remains. Even when saying "center", since there are various possibilities such as the center of a movable range, the center of a current value, the centering is not necessarily the center in a strict sense. In short, for convenience of explanation, it is merely explained by terms such as "refreshing" and "centering".

Hereinafter, description will be given to image motion and a correction method in a case where displacement of an image caused by angular signal refreshing or lens position centering is corrected by pixel shift by way of a first embodiment. In addition, description will be given to an example in a case where various conditions such as what to trigger when the centering is performed by way of a second embodiment.

First Embodiment

A first embodiment of the present disclosure will be described with reference to FIG. 9A to FIG. 9E and FIG. 10. FIG. 9A to FIG. 9E are diagrams for explaining a motion of an image by centering and image shift. FIG. 10 is a flowchart for explaining a process of an image correction method based on centering and image shift.

The motion of the image will be explained with reference to FIG. 9A to FIG. 9E. Reference numeral 1 denotes the entire pixel ($GD_1$ in FIG. 4) and reference numeral 2 denotes an effective pixel area ($A_{EFF}$ in FIG. 4) therein. The size of the effective pixel area 2 is set to be slightly smaller than the size of the entire pixel 1 and a margin for pixel shift is formed. Reference numeral 3 denotes a subject image.

Figure 9A:
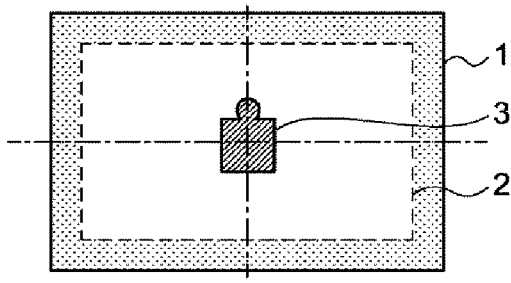
FIG. 9A to FIG. 9E are views for explaining the motion of an image by centering and image shifting.
Figure 10:
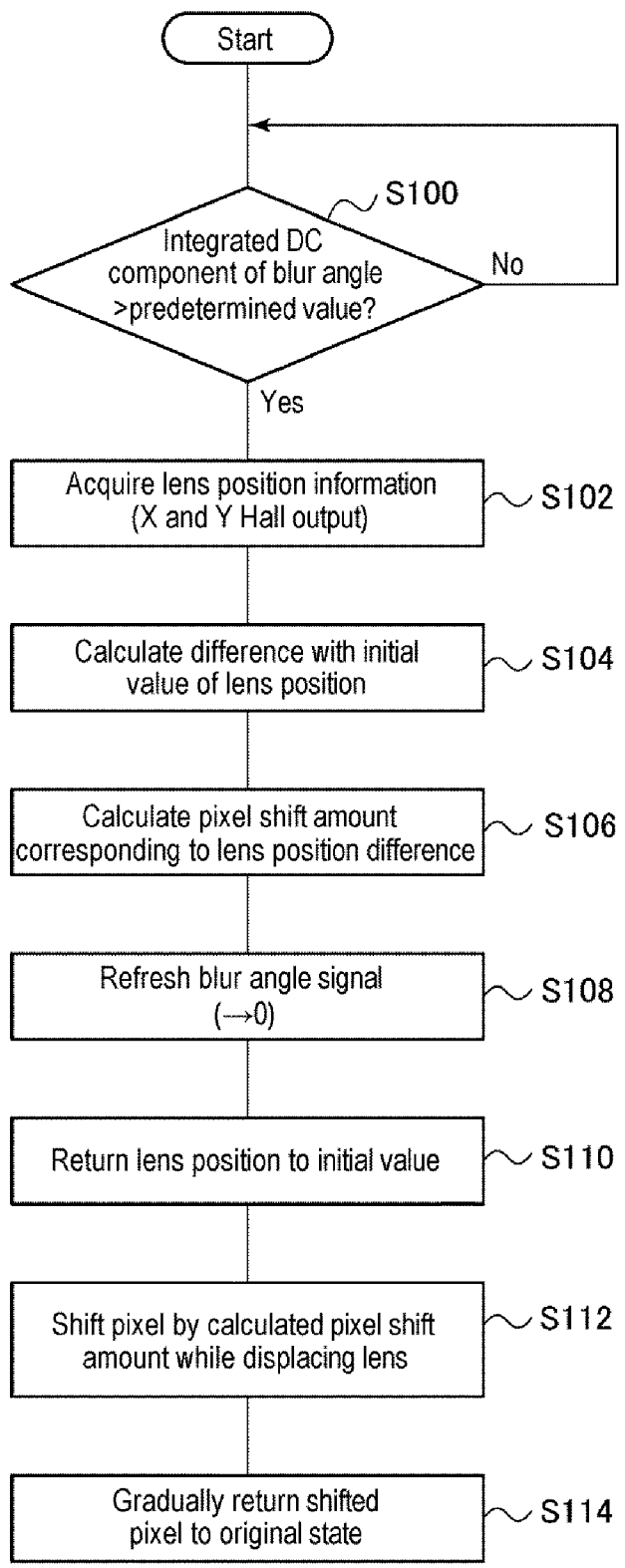
FIG. 10 is a flowchart for explaining a process of an image correction method by centering and image shifting.

FIG. 9A shows an initial state, and the subject image 3 is located at the center of the entire pixel 1 and at the center of the effective pixel area 2. The position of the effective pixel area 2 with respect to the entire pixel 1 is in a balanced position.

Figure 9B:
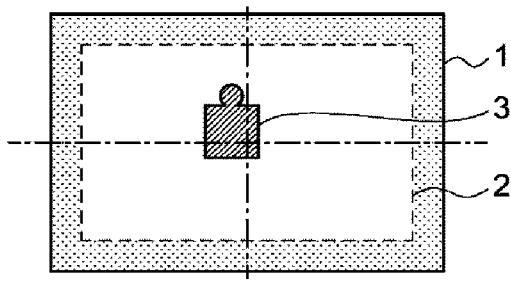

FIG. 9B shows a state where, while a hand blur correction operation is being repeated, DC offset component is accumulated in a blur angle detection signal, the lens is shifted based on the accumulated DC offset component as an error signal, and the subject image 3 is shifted from the center of the entire pixel 1 and the center of the effective pixel area 2. In this state, for example, when the position of the subject image 3 is biased as shown in the figure, since the movable range of the lens on the upper side and the left side of the image is narrow, sufficient hand blur correction may not be achieved. For example, when recognizing that a DC offset component of the blur angle exceeds a predetermined threshold value, it is desirable to perform the operation of returning the lens position to the original position.

Figure 9C:
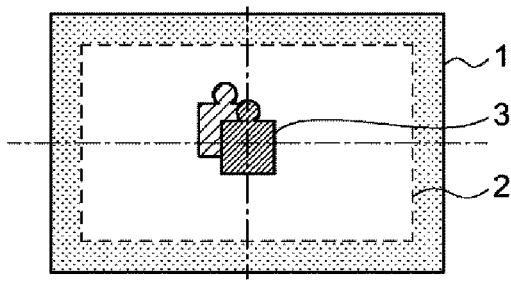

FIG. 9C shows a state where the DC offset component of the blur angle is refreshed, the lens position is centered at the initial position accordingly, and the subject image 3 becomes a state equivalent to that in FIG. 9A. The subject image 3 before centering is indicated by light gray. In a case of such rapid centering, since the subject image 3 is also shifted rapidly, a user feels as if a hand blur occurs.

Figure 9D:
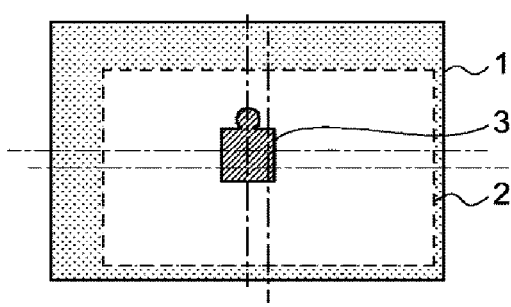

FIG. 9D shows a state where the effective pixel area 2 is changed, that is, a pixel shift is performed in order to eliminate this discomfort. In the effective pixel area 2, since the subject image 3 is at the same position as before the centering, the user does not feel a rapid shift of the image. However, in this state, the effective pixel area 2 becomes a state biased with respect to the entire pixel 1.

Figure 9E:
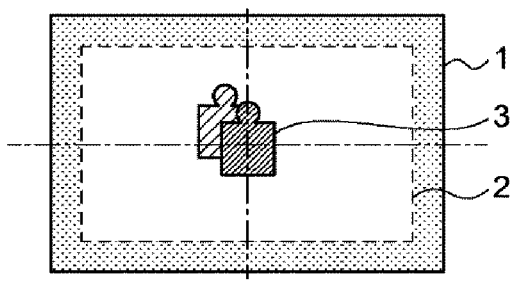

If a difference between the entire pixel 1 and the effective pixel area 2 is sufficiently large or the moving image capturing is terminated at this point, it may return to an initial state when the image capturing has stopped while putting the effective pixel in a biased state. However, when the moving image capturing is continued, the effective pixel area 2 cannot be shifted. Therefore, as shown in FIG. 9E, the shift of the effective pixel area 2 is returned to the original state. At this time, the effective pixel area is gradually shifted and returned to the state of FIG. 9A.

The term "gradually" means so slowly that a user does not misunderstand it as hand blur. That is, it means a speed of a level at which the user may misunderstand as if the user hand moved to perform a pan/tilt operation. It indicates a time until the shift of the effective pixel area 2 is returned to the state of FIG. 9A after being slowly returned to the original state, but it is desirable to finish until the next centering operation is performed.

Subsequently, the flow of process will be described with reference to the flowchart of FIG. 10. In step S100, it is determined whether or not the DC offset component of the blur angle after integration of the angular velocity signal output from the gyro sensor has reached a predetermined value ($DC_{MAX}$). If it does not exceed the predetermined value (N in S100), the hand blur correction operation is continued. If it exceeds the predetermined value (Y in S100), the refreshing operation and the centering operation are started.

In step S102, the position information of the lens at the point of start of the refreshing operation and the centering operation, that is, the X and Y Hall output signal, is acquired. In step S104, a difference between the lens position information acquired in step S102 and the initial position information is calculated. Since it is assumed that a blur signal should be refreshed to 0 at once, the expression "initial position information" is used. Normally, since the Hall signal is calibrated in a state where the blur signal is 0 and the Hall output signal in this state is set to 0, the initial position information represents the Hall signal is 0. When gradually reducing the DC offset component of the blur angle, the initial value of the lens position becomes a Hall output (latest Hall output) after the reduction of the blur angle. It is advisable to calculate the shift amount of the pixel and shift the pixel (shift the effective pixel area) each time according to the difference from the Hall output at the point of start of the refreshing operation.

In step S106, the pixel shift amount corresponding to the difference of the lens position information is calculated. The ratio of the motion amount of the subject on the pixels to the change amount of the Hall output is calculated beforehand. This ratio may be calculated for each subject, or a representative value such as an average value may be collectively used if the variation is small.

In step S108, the blur angle signal is refreshed. It is here assumed that the blur angle signal is set to 0 at once. A case of gradual change is as described above. When the DC offset component of the blur angle signal becomes 0, since an error signal (at least the DC component) disappears, the position of the lens returns to the initial position (calibration position) in S110.

In step S112, the pixel is shifted by the pixel shift amount calculated in step S106. Specifically, the effective pixel area 2 in the entire pixel 1 is moved. This makes it possible to prevent the subject image from being rapidly shifted even when a rapid lens centering operation is performed.

In step S114, the effective pixel area temporarily shifted is gradually returned to the original position. By gradually returning the effective pixel area, it is not recognized as if the hand blur has occurred. Accordingly, it is not recognized that the position of the subject is moving, or, even if it can be recognized, it may be deluded that the position of the subject is moved by pan/tilt. When a user holds a camera, the user may make such delusion. However, for example, when the image capturing is performed on a tripod, since it may be considered that the camera is not moving, it is best that the operation of returning the effective pixel area to the original state may not be performed.

Second Embodiment

Figure 11:
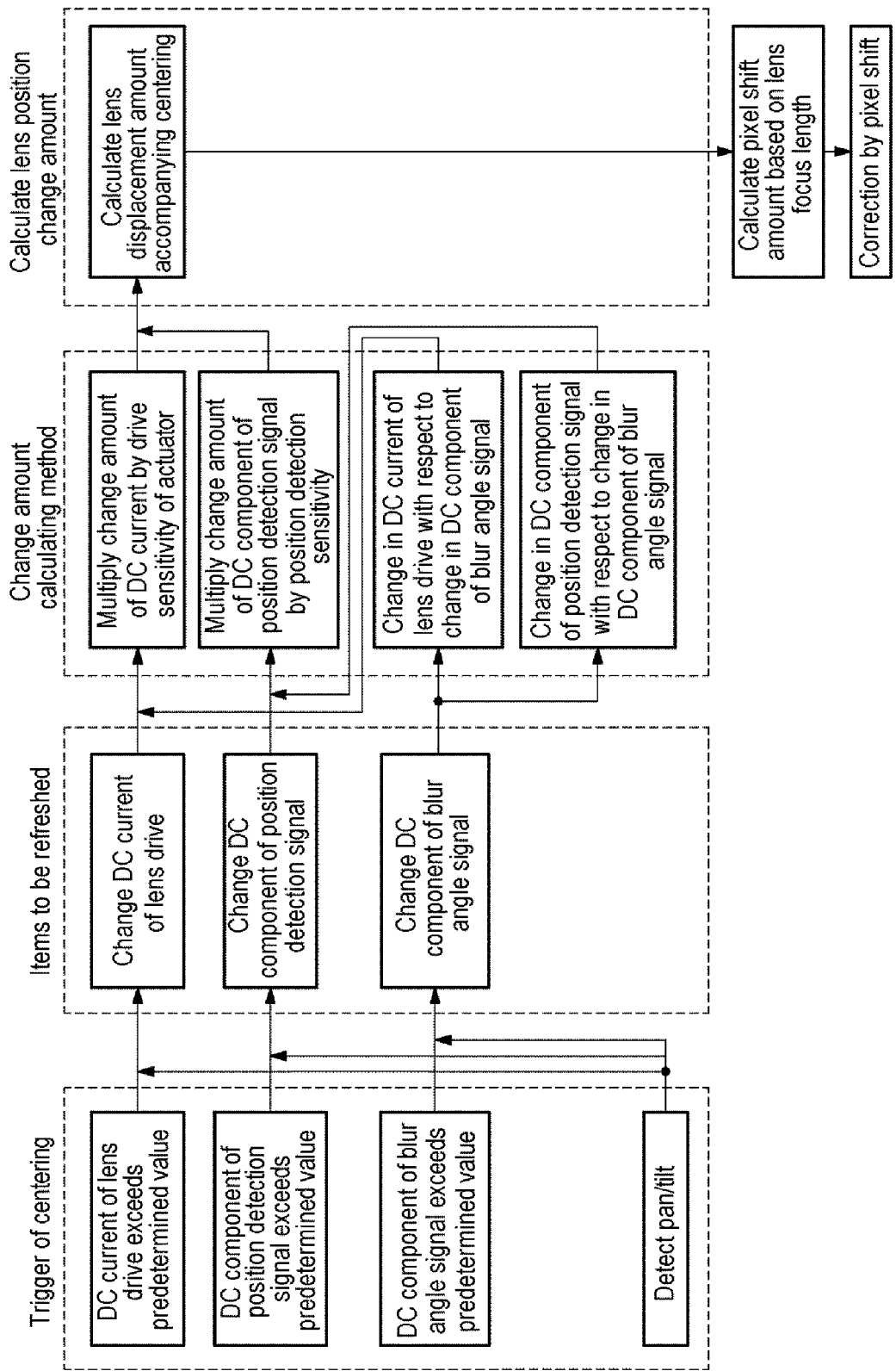
FIG. 11 is a diagram for explaining a flow of a lens displacement amount calculating method using a centering trigger and centering in various embodiments.

A second embodiment of the present disclosure will be described with reference to FIG. 11. FIG. 11 is a diagram for explaining an example in a case where various conditions such as what to trigger when centering is performed.

FIG. 11 includes the case described in the first embodiment. This case corresponds to a flow that the DC component of the blur angle signal exceeds a predetermined value→the DC component of the blur angle signal is changed→the DC component of the position detection signal with respect to the change of the DC component of the blur angle signal is changed→the change amount of the DC component of the position detection signal is multiplied by the position detection sensitivity→the displacement amount of lens associated with the centering is calculated→the pixel shift amount based on the lens focal length or the like is calculated→correction is performed by pixel shift. In the present embodiment, other cases will be mainly described.

First, as a trigger for performing the centering, it may be detected that a DC current of a DC drive exceeds a predetermined value. Here, the DC current is used because VCM is assumed as the actuator. However, the DC current may not be used in other actuators. When the DC current exceeds the predetermined value, the DC current is returned to, for example, 0. By multiplying the amount of change in the DC current at this time by the driving sensitivity of the actuator, the displacement amount of the lens can be calculated. The following process is the same as the process of the first embodiment. In a case where the actuator does not have a position detection part and performs feed-forward control according to the angle blur amount, such a method may be used.

Next, a case where the actuator has a position detection part and performs feedback control will be described. As a trigger for performing the centering, it may be detected that the DC component of the position detection signal exceeds a predetermined value. When the DC component of the position detection signal exceeds the predetermined value, the DC component of the position detection signal is forcibly set to, for example, 0. At the same time, the DC component of the blur angle signal may be refreshed to 0. When the amount of change in the DC component of the position detection signal is multiplied by the position detection sensitivity, the lens displacement amount associated with the centering can be calculated. The following process is the same as the process of the first embodiment.

As in the first embodiment, the fact that the DC component of the blur angle signal exceeds the predetermined value is used as a trigger for the centering. However, if the actuator does not have the position detection part, since the feed-forward control is performed, a change in the drive current of the actuator corresponding to a change command of the blur angle is detected, and the lens displacement amount is calculated by multiplying the change in the drive current of the actuator by the drive sensitivity of the actuator.

Finally, a case where pan/tilt is detected will be described. To determine that it is a pan/tilt operation, a DC component of the blur angle signal exceeding a predetermined value is used. Similarly to other cases, other factors, for example, an angular velocity, may be used for a determination material, and trigger criteria different from other conditions may be considered. Normally, since the pan/tilt determination is performed by a DC value lower than the threshold value of the DC offset component of the hand blur signal, the centering operation can be performed before accumulating a lot of DC components. In pan/tilt, since the lens continuously moves in one direction as described above, if the pan/tilt operation is repeated, the amount for returning the position of the lens by the centering may be set to be slightly large so that the entire movable range of the actuator can be more effectively used.

It should be noted that, regardless of the pan/tilt detection, only the DC offset component of the blur angle may be used as a determination criterion for refreshing. When it is determined as the pan/tilt, since the cutoff frequency of a high pass fitter or the like is increased to suppress the accumulation of the DC offset component of the blur angle, the pan/tilt is ended, the cutoff frequency is restored to the original state, and the refreshing may be performed at the point of time when the accumulation of DC offset components increases.

The lens control device as described above is used for a camera module for mobile phone and the like. In particular, one of the suitable applications of the lens control device of the present disclosure is an imaging device having an optical hand blur correction (OIS) function. By using the present disclosure, a user does not recognize a rapid shift of the subject image after performing the refreshing operation and the centering operation and high image quality with small image blurring is possible even at the time of capturing continuous moving image or the like. Therefore, the present disclosure is suitably applied to an imaging device having an OIS function.

The following techniques are disclosed in this present disclosure.

One disclosure relates to an imaging device. The imaging device includes an imaging lens, an imaging element, an actuator for driving the imaging lens, and a blur detection part for detecting an image blur. The imaging device corrects the image blur by driving the imaging lens according to the output of the blur detection part. The image shift occurring when the DC offset component of the position of the imaging lens is changed is corrected by pixel shift according to the amount of change in the DC offset component of the position of the imaging lens.

With the above configuration, in a case where the position of the imaging lens is biased from a predetermined position, when the position of the imaging lens is forcibly returned to the original predetermined position (centering operation), the image is rapidly shifted and the effective area of the pixel is also shifted, so that a rapid image shift cannot be seen on a monitor screen viewed by a user or on a recorded image. Accordingly, the centering can be performed without the user feeling it.

In the imaging device, the amount of change in the DC offset component of the position of the imaging lens may be calculated from the amount of change in the drive signal for driving the imaging lens.

With the above configuration, the change amount of the DC offset component of the position of the imaging lens can be calculated by multiplying the drive signal for driving the imaging lens, for example, the change amount of the current value by the drive sensitivity of the actuator, thereby facilitating correction by image shift.

Further, the imaging device includes a position detection part for detecting the position of the imaging lens and performs feedback control of the position of the imaging lens based on the output of the position detection part. The amount of change of the DC offset component of the position of the imaging lens may be calculated from the change amount of the DC offset component of the output of the position detection part.

With the above configuration, the centering operation can be performed according to the output signal of the position detection part. In addition, by converting the change amount of the position detection signal into the displacement amount of the image on the pixel, the pixel shift amount and direction can be determined, so that the user can perform the centering without recognizing a rapid image shift.

In a certain imaging device, the amount of change in the DC offset component of the position of the imaging lens may be calculated from the amount of change in the DC offset component of the output of the blur detection part.

With the above configuration, as the DC component accumulated to obtain the blur angle information by integrating the angular velocity signal detected by the blur detection part such as a gyro sensor is returned to zero (refreshed), the feedback controlled imaging lens is returned to the original position (initial setting position) and the pixel shift amount and direction can be determined by converting the amount of displacement of the lens to the displacement on the pixel at that time, so that the user can perform the centering without recognizing a rapid image shift.

In addition, a certain imaging device includes a pan/tilt detection part. When it is determined that a pan/tilt operation is performed, the DC offset component of the position of the imaging lens may be changed.

With the above configuration, the DC component of the lens position accumulated until it is determined as pan/tilt can be eliminated quickly and the centering can be performed, so that it is possible to accurately correct the image shift associated with the centering operation. If it is determined as pan/tilt, the centering operation is performed while preventing the DC component from being accumulated any more by changing the cutoff frequency of a filter. Normally, since the pan/tilt determination is performed by a DC value lower than the threshold value of the DC offset component of the hand blur signal, the centering operation can be performed more quickly.

In addition, in some imaging devices, the shift of the image occurring by the pixel shift may be gradually released.

With the above configuration, there is no pixel margin for the next pixel shift while pixel shift is performed, whereas the shifted pixel is returned to the original state so that a pixel margin can be generated again. In addition, since the pixel is gradually returned to the original state, the user hardly realizes that the image is moving. In other words, the term "gradually" used herein means that the user can not feel it, or feels it slowly to the extent that the user does not receive a sense of incompatibility or unpleasant feeling.

Further, in the imaging device, the image shift releasing operation may be performed up to the timing that the DC offset component of the next position is changed.

With the above configuration, since the bias of an effective pixel area occurring by pixel shift can be released up to the next centering, the pixel can be effectively utilized and the correction range can be widened.

The present disclosure also includes the following actuator driver. The actuator driver is an actuator driver for driving a lens actuator that corrects an image blur. The actuator driver can forcibly change the DC offset component of the lens position based on the position information of the lens. When the DC offset component is forcibly changed, a change in the DC offset component or a pixel shift amount based thereon as information for pixel shift is outputted.

With the above configuration, in a case where the position of the imaging lens is biased from a predetermined position, when forcibly returning the position of the imaging lens to the original predetermined position (centering operation), as the image is rapidly shifted, the effective pixel area can also be shifted, so that a rapid image shift cannot be seen on the monitor screen viewed by the user or the recorded image. Thus, the user can perform the centering without feeling it.

In the actuator driver, the position information of the lens may be obtained from a drive current of the actuator.

Further, in the actuator driver, the position information of the lens may be obtained from a signal of the position detection part included in the actuator.

Further, the actuator driver may include a part for calculating the blur angle based on the angular velocity information output from the blur detection part and may change the position of the lens by changing the DC offset component of the blur angle.

Further, the actuator driver may include a pan/tilt detection part. When it is determined that the pan/tilt operation is performed, the DC offset component of the position of the imaging lens may be changed.

The present disclosure includes the following image correction method. The image correction method is an image correction method in an imaging device capable of correcting an image blur by changing the position of an imaging lens by an actuator in response to a generated blur. The image correction method includes: forcibly changing the DC offset component of the position of the imaging lens at a predetermined timing, storing the position information of the imaging lens immediately before forcibly changing the DC offset component of the position of the imaging lens, calculating a difference between the position information of the imaging lens after the forcible change and the stored position information, and correcting the image shift caused by the forcible position change of the imaging lens by shifting the effective pixel area of an imaging element according to the calculated difference.

With the above configuration, in a case where the position of the imaging lens is biased from a predetermined position, when forcibly returning the position of the imaging lens to the original predetermined position (centering operation), as the image is rapidly shifted, since the effective pixel area can also be shifted, a rapid image shift cannot be seen on the monitor screen viewed by the user or the recorded image, so that the user can perform the centering without feeling it.

In the image correction method, the position information of the imaging lens may be obtained from an actuator drive signal for driving the imaging lens.

Further, in the image correction method, the position information of the imaging lens may be obtained from a signal of the position detection part included in the actuator for driving the imaging lens.

Further, the image correction method may further include gradually releasing the image shift after correcting the image shift due to the forcible position change of the imaging lens.

Further, in the image correction method, the operation of releasing the image shift may be performed up to timing that the DC offset component of the position of the imaging lens is forcibly changed next.

According to the present disclosure in some embodiments, it is possible to suppress shift of an image occurring by a centering operation.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An actuator driver that drives an actuator for determining a position of an imaging lens for correcting an image blur,
wherein a DC component of the position of the imaging lens is forcibly changed based on position information of the imaging lens, and, in case of forcibly changing the DC component, a forcible change amount of the position of the imaging lens or an amount of shift of an effective pixel area based on the forcible change amount as information for shift of the effective pixel area is output, wherein the position information of the imaging lens is obtained from a position detection signal from a position detection part included in the actuator, wherein the actuator driver is configured to feedback-control the position of the imaging lens based on the position detection signal, and wherein the forcible change amount of the position of the imaging lens is calculated, from a change amount of a DC component of the position detection signal.

2. The actuator driver of claim 1, wherein the position information of the imaging lens is obtained from a drive current of the actuator.

3. The actuator driver of claim 2, further comprising a calculation part configured to calculate a blur angle based on angular velocity information from a blur detection part, wherein the position of the imaging lens is forcibly changed by changing a DC component of the blur angle.

4. The actuator driver of claim 2, further comprising a pan/tilt detection part, wherein, when it is determined as a pan/tilt operation, a DC component of the position of the imaging lens is changed.

\* \* \* \* \*